US012272510B2

(12) United States Patent
Thingstad Pettersen et al.

(10) Patent No.: US 12,272,510 B2
(45) Date of Patent: Apr. 8, 2025

(54) SWITCH-FUSE MODULE

(71) Applicant: ABB Schweiz AG, Baden (CH)

(72) Inventors: Terje Thingstad Pettersen, Skien (NO); Ståle Talmo, Skien (NO); Stanley Lohne, Porsgrunn (NO); Elham Attar, Skien (NO)

(73) Assignee: ABB Schweiz AG, Baden (CH)

( * ) Notice: Subject to any disclaimer, the term of this patent is extended or adjusted under 35 U.S.C. 154(b) by 530 days.

(21) Appl. No.: 17/653,977

(22) Filed: Mar. 8, 2022

(65) Prior Publication Data

US 2022/0293352 A1 Sep. 15, 2022

(30) Foreign Application Priority Data

Mar. 11, 2021 (EP) .................................... 21162047

(51) Int. Cl.
*H01H 9/10* (2006.01)
*H01H 3/46* (2006.01)
(Continued)

(52) U.S. Cl.
CPC ............ *H01H 9/104* (2013.01); *H01H 9/102* (2013.01); *H01H 9/22* (2013.01); *H01H 31/12* (2013.01)

(58) Field of Classification Search
CPC .......... H01H 9/104; H01H 9/102; H01H 9/22; H01H 31/12; H01H 9/226; H01H 33/022;
(Continued)

(56) References Cited

U.S. PATENT DOCUMENTS

| | | | | |
|---|---|---|---|---|
| 1,903,956 A * | 4/1933 | Christie | ................. | H01H 9/104 361/616 |
| 3,290,468 A | 12/1966 | Clark, Jr. et al. | | |

(Continued)

FOREIGN PATENT DOCUMENTS

| | | | | |
|---|---|---|---|---|
| FR | 2730357 A1 * | 8/1996 | ............. | H01H 79/00 |
| GB | 376829 A | 7/1932 | | |
| GB | 829312 A | 3/1960 | | |

OTHER PUBLICATIONS

Folliot Philippe; Panazio Stephane, "Electrical disconnection system for transformer immersed in dielectric isolating liquid", Aug. 9, 1996, Alsthom Gec., Entire Document (Translation of FR 2730357) (Year: 1996).*

(Continued)

*Primary Examiner* — Stephen S Sul
(74) *Attorney, Agent, or Firm* — Whitmyer IP Group LLC

(57) ABSTRACT

A switch-fuse module includes: a security device, a fuse; and a fuse canister having the fuse inside. The security device includes at least one slider linearly movable between open and closed positions; an earthing switch that is galvanically connected to the fuse, and is coupled to the slider such that the open position effects an open state of the earthing switch and the closed position effects an closed state of the earthing switch; a propulsion element configured to move the earthing switch from the open to the closed state when discharging; and a locking mechanism configured to block access to the fuse in a locked state. The slider is coupled to the locking mechanism such that the slider in the closed position while the locking mechanism is in the unlocked state, so that the fuse is only accessible if it is ensured that the fuse is earthed.

26 Claims, 3 Drawing Sheets

(51) Int. Cl.
*H01H 9/22* (2006.01)
*H01H 31/12* (2006.01)

(58) Field of Classification Search
CPC ............. H01H 33/22; H01H 2033/566; H01H 31/003; H01H 85/0095; H01H 85/25
See application file for complete search history.

(56) References Cited

U.S. PATENT DOCUMENTS

| | | | | | |
|---|---|---|---|---|---|
| 3,327,076 | A * | 6/1967 | Lindell | H02B 11/26 | 200/50.23 |
| 3,339,118 | A * | 8/1967 | Harner | H01H 31/122 | 337/201 |
| 4,463,227 | A * | 7/1984 | Dizon | H02B 11/26 | 361/628 |
| 4,778,959 | A * | 10/1988 | Sabatella | H01H 21/42 | 200/453 |
| 6,717,076 | B2 | 4/2004 | Narusevicius et al. | | |
| 2013/0292358 | A1 * | 11/2013 | Hu | H01H 33/42 | 218/5 |

OTHER PUBLICATIONS

Extended European Saerch Report; Application No. 21162047.1; Completed: Aug. 24, 2021; Issued: Sep. 2, 2021; 8 Pages.

* cited by examiner

SWITCH-FUSE MODULE

TECHNICAL FIELD

Embodiments of the present disclosure relate to a switch-fuse module, in particular a switch-fuse module having a security device that provides increased safety when operating the switch-fuse module, especially by an earthing switch. Embodiments of the present disclosure also relate to a ring main unit including the switch-fuse module, and to a method of operating the switch-fuse module.

BACKGROUND

A large number of area secondary substations including medium- or high-voltage equipment is required to distribute power to end customers in urban and rural areas. In the day-to-day operation of such equipment, for example when manually opening to access and/or change a fuse within a switch-fuse module, hazardous access can happen due to human factors.

If the operator accidentally accesses current-carrying elements of the equipment, for example through incorrect operation, this can have serious consequences in view of the existing voltages.

It is therefore a need to provide a switch-fuse module which can be operated in a particularly safe manner, and which ensures reliable earthing of all current-carrying elements when accessed.

Terms and Definitions

This application uses terms whose meaning is briefly explained here.

The term axial refers to a longitudinal axis of an element or unit. The term longitudinal refers to a direction in which the element has the greatest spatial extension and/or a symmetry axis. The term lateral refers to a direction perpendicular to the longitudinal axis, in which the object has the second largest extension and/or which is parallel to a horizontal direction when mounted in a regular mounting orientation. An axial direction refers to a direction parallel to the longitudinal axis of the element.

Value ranges defined as x1, or x2, etc. to y1, or y2, etc. mean that the values are within intervals such as x1 to y1, or x1 to y2, or x2 to y1, or x2 to y2, etc.

An x- and z-direction as shown in FIG. 3*a* may be perpendicular to each other and may define a horizontal or x-z plane. The y-direction may then be a vertical direction, perpendicular to the horizontal plane. A view of the switch-fuse module in a direction perpendicular to z-y plane may be a side view. Accordingly, a footprint may be in the horizontal plane. Similarly, a view of the switch-fuse module in a direction perpendicular to x-y plane may be a front or back view. Terms such as "vertical" and "horizontal" may refer to the respective directions when the switch-fuse module is mounted in a regular mounting orientation in which the module is ready for operation, especially with an operating panel oriented on a vertical front face of the switch-fuse module.

The terms "above" and "below" refer to positions that differ with respect to the y-axis. An object A is positioned above (or below) an object B if the y-coordinate of the centroid of object A has a higher (or lower) value than the y-coordinate of the centroid of object B.

The terms "front" and "back" refer to positions that differ with respect to the z-axis. A first position is referred to as a front (or back) relative to a second position if the z coordinate of the first position has a lower (or higher) value than the second position. For example, the front (or back) of a module is the region which substantially has the lowest (or highest) z-coordinate of the module. The front is the side of the object usually facing a user or operator.

The term "inward" (or "outward") refers to an object and denotes a direction originating from a point outside the centroid of the object and essentially pointing towards (or away from) the centroid.

A height of an object may be understood as an object extension in the y direction, a depth may be understood as an object extension in the z direction, and a width may be understood as an object extension in the x direction.

In this document, "or" is understood as a non-exclusive disjunction. Accordingly, the link "A or B" expresses that at least one of the involved statements A, B is true.

Furthermore, the terms "a" or "the", such as in the expression "a fuse" or "the fuse", are used to refer to at least one fuse. The quantity "a" or "the" includes the quantity "at least one". If the term "at least one" is used explicitly, a subsequent use of "a" or "the" does not imply any deviation from the aforementioned principle according to which "a" or "the" is to be understood as "at least one".

The terms "substantially" or "basically" as used herein typically imply that there may be a certain deviation, e.g. up to 1%, up to 3% or up to 10%, from the characteristic denoted with "substantially".

SUMMARY

In view of the above, a switch-fuse module, a method for operating the switch-fuse module, and a ring-main unit having a switch-fuse module according to the claims are provided.

According to an aspect of the present disclosure, a switch-fuse module having a security device is provided. The switch-fuse module includes: at least one fuse, and at least one fuse canister having the fuse inside.

The security device includes: at least one slider, at least one earthing switch, an energy-storing propulsion element, and a locking mechanism.

The slider is configured to linearly move between an open slider position and a closed slider position. The earthing switch is i) galvanically connected to an end of the fuse, ii) operable between an open and a closed state, iii) designed to earth the end of the fuse in the closed state, and iv) coupled to the slider in such a manner that the open slider position effects the open state of the earthing switch and the closed slider position effects the closed state of the earthing switch.

The energy-storing propulsion element is configured to move the earthing switch from the open to the closed state when discharging. The locking mechanism is adapted for blocking access to the fuse in a locked state and for releasing access to the fuse in an unlocked state.

The slider is coupled to the locking mechanism in such a manner that the slider is in the closed slider position while the locking mechanism is in the unlocked state.

The security device provides that the fuse may only be accessed if it is ensured that the fuse is earthed.

According to another aspect of the present disclosure, a ring main unit is provided.

The ring main unit includes the switch-fuse module.

According to another aspect of the present disclosure, a method of operating a switch-fuse module having the security device is provided. The method includes a first step and a second step.

The first method step includes moving the slider from the closed slider position to the open slider position to i) bias or charge the energy-storing propulsion element,
ii) turn the earthing switch to the open state, and
iii) lock the locking mechanism for blocking access to the fuse.

The second method step includes moving the slider from the open slider position to the closed slider position to i) move the earthing switch from the open to the closed state while the propulsion element discharges, for earthing the end of the fuse, and
ii) unlock the locking mechanism for releasing access to the fuse.

Some advantages relating to the switch-fuse module, the ring main unit and the method of operating the switch-fuse module are described as follows.

An advantage is that when the fuse is accessed, it is ensured that the fuse is earthed, which always guarantees the safety of the operator.

An advantage is that when the fuse is not earthed, the fuse cannot be accessed, which prevents dangerous access of the operator to the fuse.

Overall, the security device ensures that the switch-fuse module can be operated in a particularly safe manner, and in particular ensures that the end of the fuse is earthed when access to the fuse is unlocked.

Further aspects, advantages and features of the present disclosure are apparent from the dependent claims, the description and the accompanying drawings.

BRIEF DESCRIPTION OF THE DRAWINGS

So that the manner in which the above recited features of the present disclosure can be understood in detail, a more particular description of the present disclosure, briefly summarized above, may be given by reference to typical embodiments. The accompanying drawings relate to embodiments of the present disclosure and are described in the following.

DETAILED DESCRIPTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described.

The reference numbers of the figures are used merely for illustration. The aspects of the invention are not limited to any particular embodiment. Instead, any aspect or embodiment described herein can be combined with any other aspect or embodiment described herein unless specified otherwise.

Figure 2A:
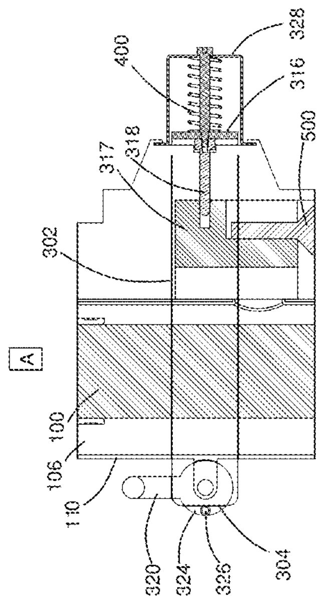
FIGS. 2*a*, 2*b* show detail A from FIG. 1 wherein the locking mechanism of the security device is in the unlocked state (FIG. 2*a*) and in the locked state (FIG. 2*b*), according to embodiments described herein.
Figure 2B:
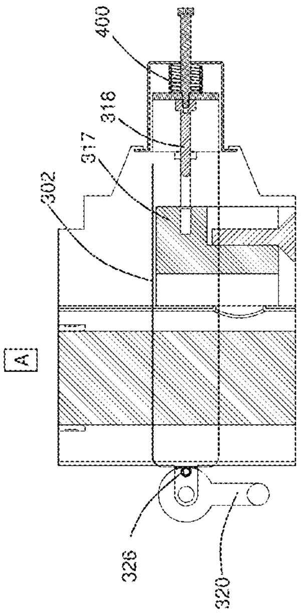
Figure 1:
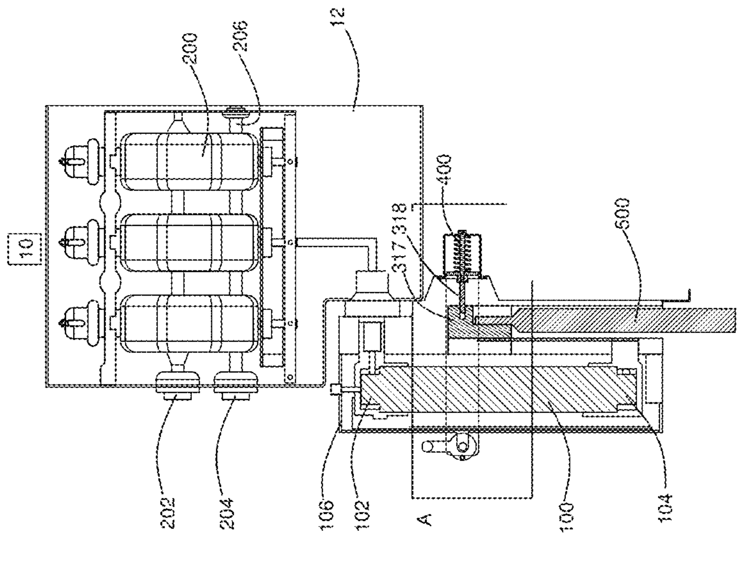
FIG. 1 shows a schematic side view of a switch-fuse module according to embodiments described herein.

FIG. 1 shows a schematic side view of a switch-fuse module, wherein some additional typical parts like actuators, levers, motors, canister lids are omitted in the Figures for the sake of clarity. FIGS. 2*a*, 2*b* show detail A from FIG. 1 wherein the locking mechanism is in the unlocked state (FIG. 2*a*) and in the locked state (FIG. 2*b*), according to embodiments of the present invention. Details explained with illustrative reference to FIGS. 1, 2*a*, 2*b* shall not be understood as limited to the elements of FIGS. 1, 2*a*, 2*b*. Rather, those details may also be combined with further aspects or embodiments, e.g., explained with illustrative reference to the other figures.

According to embodiments described herein, a switch-fuse module 10 having a security device 300 is provided. The switch-fuse module 10 may include: at least one fuse 100, and at least one fuse canister 106 having the fuse 100 inside.

The security device 300 may include: at least one slider 302, 306, at least one earthing switch 317, 318, an energy-storing propulsion element 400, and a locking mechanism.

The slider 302, 306 may be configured to linearly move between an open slider position and a closed slider position. The slider 302, 306 may be formed as an elongated slat or strip having a length that exceeds the depth of the canister 106. Preferably, the slider 302, 306 can be made of an electrically insulating material such as plastic.

The earthing switch 317, 318 may be i) galvanically connected to an end 102 or 104 of the fuse 100,
ii) operable between an open and a closed state,
iii) designed to earth the end 102 or 104 of the fuse 100 in the closed state, and
iv) coupled to the slider 302, 306 in such a manner that the open slider position effects the open state of the earthing switch 317, 318 and the closed slider position effects the closed state of the earthing switch 317, 318.

Herein, the term "effects" has the meaning of "is associated with". In other words, the earthing switch 317, 318 and the slider 302, 306 are coupled to each other such that the open slider position is associated with the open state of the earthing switch 317, 318. In particular, the coupling ensures that when the earthing switch is in the open state, the slider is in the open slider position, and/or vice versa; and analogously that when the earthing switch is in the closed state, the slider is in the closed slider position, and/or vice versa. For example, the slider may be mechanically (e.g., rigidly) connected to a movable earthing contact of the earthing switch for obtaining this coupling.

The energy-storing propulsion element 400 may be configured to move the earthing switch 317, 318 from the open to the closed state when discharging. The locking mechanism may be adapted for blocking access to the fuse 100 in a locked state (handle 320 pointing downwards in FIGS. 2*b*, 3*b*, 4*b*) and for releasing access to the fuse 100 in an unlocked state. in a manner not shown in the Figures but known to the skilled person.

Figure 4A:
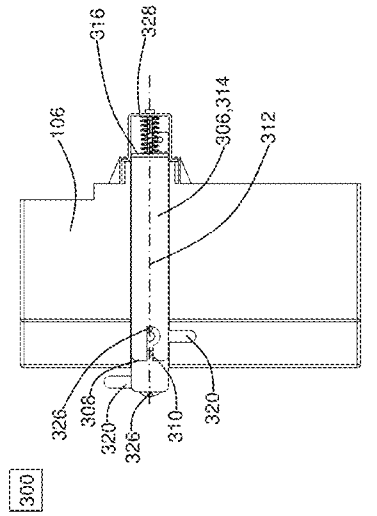
FIGS. 4*a*, 4*b* show schematic side views of a security device wherein the locking mechanism is in the unlocked state (FIG. 4*a*) and in the locked state (FIG. 4*b*), according to embodiments described herein.
Figure 4B:
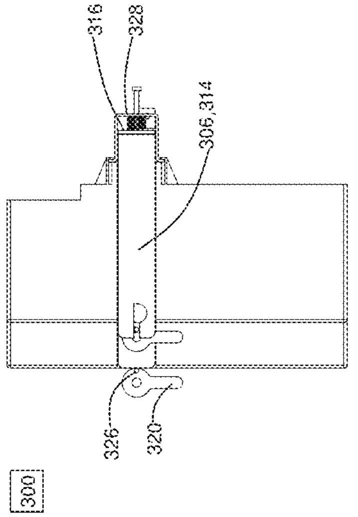

The slider 302 may be coupled to the locking mechanism in such a manner that the slider 302 is in the closed slider position while (when) the locking mechanism is in the unlocked state. Due to this coupling, it is ensured that the slider 302 is in the closed slider position whenever the locking mechanism is in the unlocked state. Thus, due to the coupling, the closed slider position of the slider may be associated with the unlocked state of the locking mechanism. The coupling may for example be adapted for bringing the slider to the closed slider position whenever the locking mechanism is brought to the unlocked state, as illustrated in FIG. 2*a*. Alternatively or additionally, the coupling may be adapted for blocking the locking mechanism from the unlocked state unless the slider is in the closed slider position, as illustrated in FIGS. 4*a* and 4*b* described further below.

The security device provides that the fuse 100 may only be accessed if it is ensured that the fuse 100 is earthed.

According to embodiments described herein, a ring main unit (not shown in the figures) may include the switch-fuse module 10.

The described concept of the security device 300, wherein a movement of the slider 302 is related to allowing or preventing operator access to the fuse 100, enables access control to the fuse 100.

A technical effect of the earthing switch 317, 318 being coupled to the slider 302 in such a manner that the open slider position effects the open state of the earthing switch 317, 318 and the closed slider position effects the closed state of the earthing switch 317, 318, enhances the access control to the fuse 100 in that the fuse 100 may only be accessed if it is ensured that the fuse 100 is earthed. This effect is beneficial in that it ensures that access, whenever it can be made, is safe and non-hazardous.

A technical effect of the slider 302 being coupled to the locking mechanism in such a manner that the slider 302 is in the closed slider position while the locking mechanism is in the unlocked state, enhances the access control to the fuse 100 in that the fuse 100 cannot be accessed when the fuse 100 is not earthed. This effect is beneficial in that unsafe or dangerous access cannot be made, especially is prevented or not allowed.

Figure 3A:
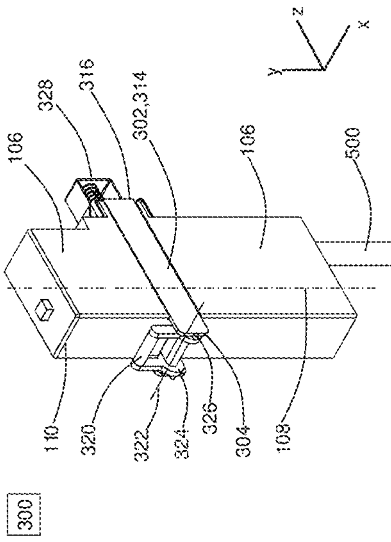
FIGS. 3*a*, 3*b*, 3*c* show perspective 3D views of a security device wherein the 30 locking mechanism is in the unlocked state (FIG. 3*a*) and in the locked state (FIGS. 3*b*-3*c*), according to embodiments described herein.
Figure 3B:
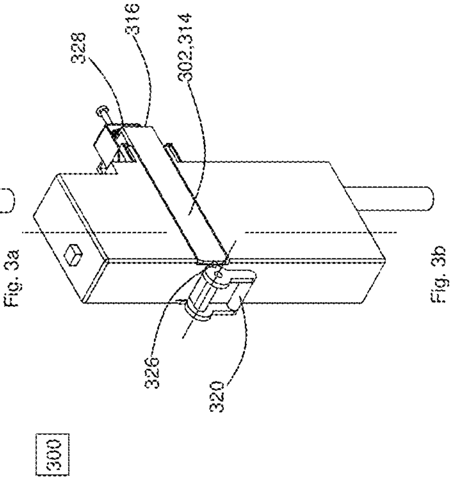

FIGS. 3*a*, 3*b* show perspective 3D views of a security device 300, wherein the locking mechanism is in the unlocked state (FIG. 3*a*) and in the locked state (FIG. 3*b*), according to a first embodiment of the present invention. Details explained with illustrative reference to FIGS. 3*a*, 3*b* shall not be understood as limited to the elements of FIGS. 3*a*, 3*b*. Rather, those details may also be combined with further embodiments explained with illustrative reference to the other figures.

According to embodiments, the slider 302 may be coupled to the locking mechanism in such a manner that the open slider position effects the locked state of the locking mechanism. In other words, the open slider position is associated with the locked state of the locking mechanism. For example, due to the coupling, the coupling may be adapted for bringing the slider to the open slider position by bringing the locking mechanism into the locked state, as illustrated by the pin 326 in FIGS. 3*a* and 3*b*.

The coupling between the locking mechanism and the slider described herein enhances the access control to the fuse 100 in that the fuse 100 cannot be accessed when the fuse 100 is not earthed, but that it may be accessed when earthed. This effect is beneficial in that unsafe or dangerous access cannot be made, especially is prevented, or not allowed.

According to embodiments, the locking mechanism may include a rotatable access handle 320, preferably rotatable around a handle rotation axis 322, especially between an open position and a closed position.

According to embodiments, the locking mechanism may include a rotatable access handle 320 that includes a rotatable disc 324.

According to embodiments, the locking mechanism may include a conversion mechanism 324, 326 converting a rotation motion of the access handle 320 into a linear motion or propulsion of the slider 302 when the access handle 320 is rotated, preferably by an operator. The conversion mechanism 324, 326, preferably linked to the locking mechanism, has several beneficial technical effects. First, a rotational movement is easier and more reliable for the operator to perform than a translational movement; the effect is beneficial for correct and easy handling by the operator. Secondly, the rotational movement may effect locking or unlocking of the locking mechanism; this effect is beneficial for providing security. And thirdly, the coupling of the locking mechanism and the conversion mechanism 324, 326 has the synergetic effect of safe operability in the sense of easy and error-free operability combined with safety for the user when operating the device.

According to embodiments, the slider 302 may be movable between the open and the closed positions along a longitudinal slider axis 312. Especially, the slider 302 may have a front edge 304, 308 that is lateral to the longitudinal slider axis 312 and/or may be close and preferably lateral to the handle rotation axis 322. Preferably, the slider 302, 306 may include side arms 314 enclosing both sidewalls of the fuse canister 106. A slider side arm 314 may be formed as an elongated slat or strip having a length that exceeds the depth of the canister 106. Preferably, the slider side arm 314 can be made of an electrically insulating material such as plastic.

According to embodiments, the conversion mechanism 324, 326 may include a conversion device such as a rotatable disc with a driving pin 326 pointing laterally outwards, the term "outwards" being related to the fuse canister 106. The conversion device may also include a cam, an eccentric, or a scotch yoke.

According to embodiments, the access handle 320 may have a structure with multiple functions. The access handle 320 may include a rotatable disc, preferably the disc including a lateral driving pin 326 eccentrically located on the disc at a distance from the handle rotation axis 322 and pointing laterally outwards, the term "outwards" being related to the fuse canister 106. According to embodiments, the driving pin 326 may be adapted to rotate eccentrically with respect to the slider 302 when the disc is rotated and to interact with a slider front edge 304 for converting a disc rotation into a slider translation movement. Especially, the driving pin 326 may be adapted to block access to the fuse 100 when the access handle 320 is in the open position, and/or to release access to the fuse 100 when the access handle 320 is in the closed position.

A technical effect of the specified access handle 320 structure is that the access handle 320 provides a dual action. On the one hand, it can cause the linear slider movement and thus the grounding or earthing the end 102 or 104 of the fuse 100, and on the other hand, it can control the locking mechanism to allow or prevent access to the fuse 100. This effect is beneficial in that it ensures that access, whenever it can be made, is safe, and that unsafe access cannot be made.

According to embodiments, the fuse canister 106 may include a removable front cover 110 mounted at the canister front. The canister cover 110 may be fixed in the open slider position, thus blocking access to the fuse 100. Especially, the canister cover 110 may be removable in the closed slider position, thus releasing access to the fuse 100. That means that in the closed slider position the operator is allowed to remove the front canister cover 110 and access the fuse 100. Especially, the locking mechanism may include the canister cover 110, i.e. the canister cover 110 may be part of the locking mechanism.

According to embodiments, the locking mechanism may include a cover fastener. Functionally, the cover fastener may be adapted to fix the canister cover 110 in the open slider position and/or to release the canister cover 110 in the closed slider position. Structurally, the cover fastener may include i) the rotatable disc with a driving pin pointing laterally inwards and/or ii) a flange 303 of the slider 302 pointing laterally inwards (FIG. 3*c*), such as a protruding ridge, protruding lip or protruding edge of the slider 302.

Figure 3C:
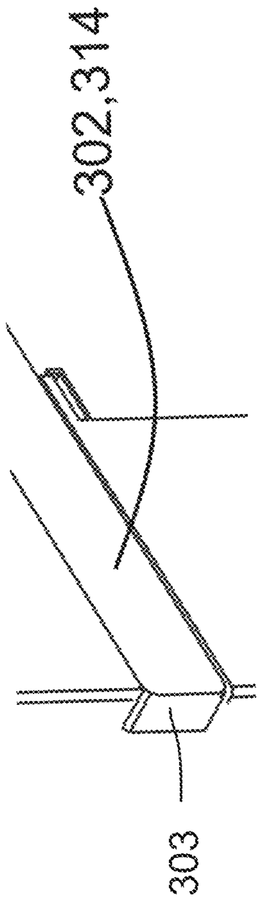

According to a non-limiting example illustrating the embodiment i) of the cover fastener, the access control to the fuse 100 is as follows:

- In the unlocked state (closed position of the slider 302) shown in FIG. 3*a*, the inward-facing slider flange 303 (not shown) is distanced to the front edge 304 of the slider 302, thus allowing removal of the cover 110.
- In the locked state (open position of the slider 302) shown in FIGS. 3*b* and 3*c*, the inward-facing slider flange 303 substantially abuts against the front edge 304 of the slider 302, thus preventing removal of the cover 110.

According to a non-limiting example illustrating the embodiment ii) of the cover fastener, the access control to the fuse 100 is as follows:

- In the unlocked state (closed position of the slider 302) shown in FIG. 3*a*, the inward-facing slider flange (not shown) is distanced to the front edge 304 of the slider 302, thus allowing removal of the cover 110.
- In the locked state (open position of the slider 302) shown in FIG. 3*b*, the inward-facing slider flange substantially abuts against the front edge 304 of the slider 302, thus preventing removal of the cover 110.

According to embodiments, the propulsion element 400 may be configured as an elastic element. Preferably, the elastic element may include a compression spring, an extension spring, a torsion spring, or an elastic washer. According to embodiments, the compression spring may include a helical spring, a gas spring, or a magnetic spring.

According to embodiments, the propulsion element 400 may be arranged at a back panel 316 of the slider 302 located longitudinally opposed to the front edge 304, wherein preferably the propulsion element 400 is configured for being compressed between the slider back panel 316 and a fixed stopper 328 of the fuse canister 106. According to embodiments, the slider back panel 316 may be configured as an earthing bar of the earthing switch 317, 318.

According to embodiments, the propulsion element 400 may be configured, in the biased state, to i) move the slider 302 from the open to the closed state when discharging, and/or to ii) move both the earthing switch 317, 318 and the slider 302, preferably simultaneously, when discharging. According to embodiments, the access handle 320 may be adapted, when rotating from the access handle 320 open position to the access handle 320 closed position, to allow the energy-storing element to move the slider 302 when discharging, wherein especially a slider propulsion or slider movement is confined by a rotation angle of the access handle 320, especially by a position of the driving pin 326.

According to embodiments, the access handle 320 may be adapted, when rotating from a handle open position to a handle closed position, to allow the propulsion element 400 to move the slider 302 when discharging.

FIGS. 4*a*, 4*b* show schematic side views of a security device 300 wherein one of the locking mechanisms is in the unlocked state (FIG. 4*a*) and in the locked state (FIG. 4*b*), according to a second embodiment of the present invention. Details explained with illustrative reference to FIGS. 4*a*, 4*b* shall not be understood as limited to the elements of FIGS. 4*a*, 4*b*. Rather, those details may also be combined with further embodiments explained with illustrative reference to the other figures.

FIGS. 4*a*, 4*b* show two fuse canisters illustrating two different embodiments. The security device of the left fuse canister corresponds to that of FIGS. 2*a*, 2*b*, and the description of these Figures analogously apply to the left fuse container and its security device of FIGS. 4*a*, 4*b*. Hence, the left fuse canister has a slider whose motion between the open and closed position is actuated by the propulsion element biasing the slider towards the closed position, and by the coupling to the locking mechanism (pin 326) allowing the closed position (unlocked state, FIGS. 2*a* and 4*a*) or pushing the slider to the open position (locked state, FIGS. 2*b* and 4*b*).

The differences of the embodiment illustrated by the right fuse canister of FIGS. 4*a*, 4*b* are now described in more detail in the following. The slider is moveable between the open and closed position and is coupled to the earth switch as described above for the other embodiments. Unlike the embodiment of FIGS. 2*a* and 2*b*, the motion between the open and closed position of the slider (and of the earthing switch coupled to the slider) is actuated by an external moving mechanism (in FIGS. 4*a*, 4*b* by being coupled to the slider of the other fuse canister so that both sliders move jointly when the locking mechanism of the other fuse canister is operated). Therefore, the propulsion element is optional in this embodiment.

Next, the coupling between the slider and the locking mechanism, as illustrated by the right fuse canister of FIGS. 4*a*, 4*b*, is described in more detail. In both FIGS. 4*a* and 4*b*, the locking mechanism (right lever 320) is in the locked position. The slider 306 is coupled to the locking mechanism 320 by the engagement of a locking mechanism engagement element (here: pin 326 of the locking mechanism) with a slider engagement element (here: slot 310 of the slider 306), the engagement being such that in the open position of the slider 306, the locking mechanism is blocked in the locked state, whereas in the closed position of the slider 306, the locking mechanism is unblocked and free to be brought to the unlocked state.

Specifically, in the embodiment of FIGS. 4*a* and 4*b*, the locking mechanism engagement element is a pin 326 of the locking mechanism engaged in the slot 310 (slider engagement element) of the slider 306. The slot 310 is shaped such that when the slider is in the open position (FIG. 4*b*), the engagement between pin 326 and slot 310 blocks the locking mechanism in the locked state (right handle facing downwards), whereas when the slider is in the closed position (FIG. 4*a*), a widened (half-circular) area of the slot is moved into proximity of the pin 326 so that the blocking is released, allowing the locking mechanism to be brought to the unlocked state (FIG. 4*a*: the right handle, although still facing downwards, is unblocked and thus allowed to be moved upwards). Thus, according to an embodiment, when the slider is in the open position the engagement between the locking mechanism engagement element and the slider engagement element blocks the locking mechanism in the locked state, whereas when the slider is in the closed position, the engagement is at least partially released, allowing the locking mechanism to be brought to the unlocked state.

Furthermore, the slot 310 may be provided with an end stop for blocking the slider 306 from being moved to the open position, by engagement of the stopper with the pin 326 when the locking mechanism in the locked state (but allowing this movement when the locking mechanism in the unlocked state). This stopper can be provided as a closed end of the slot 310 (closed left-side end of the slot 310 in FIGS. 4*a* and 4*b*, as an alternative to the open left-side end shown in FIGS. 4*a* and 4*b*). When the right lever in FIG. 4*b* is flipped upwards (i.e., the locking mechanism is in the locked state), the corresponding pin 326 is at a more leftward position compared to the position shown in FIG. 4*b*, which shows the unlocked state. In the locked state with the pin at the more leftward position than shown in FIG. 4*b*, the stopper at the left-end of the slot 310 blocks the slider from reaching the open position. In other words, the open position shown in FIG. 4*b* can only be reached by the slider 306 when the locking mechanism in the unlocked state, i.e., when the right lever is in the down position as shown in FIG. 4*b*.

Hence, with the end stop described above being included at the left side of the slot 310 shown in FIG. 4*a*, when the right handle is moved upwards, the engagement between pin 326 and the end stop at the left end of slot 310 blocks the slider in the closed position, because of the end stop blocking the slider 306 from being moved to the open position. Thereby, the coupling ensures that the slider 306 is in the closed slider position while the locking mechanism is in the unlocked state.

According to embodiments, the at least one slider 302, 306 may include a first slider 302 and a second slider 306 (and optionally also a third slider, one per phase). The sliders may be rigidly coupled for joint movement. Each of the sliders may be coupled to a respective earth switch for a respective fuse end as described herein.

According to embodiments, the first slider front edge 304 may extend continuously over a, preferably entire, lateral extent of the first slider front edge 304, especially wherein the front edge 304 is formed in one of the side arms 314, especially in both side arms 314 of the first slider 302. The first slider 302 is included in the first embodiment of the security device 300 as shown in FIGS. 3*a*, 3*b*.

The second slider 306 may have a slot 310 extending between the second slider front edge 308 and an opening of the second slider 306 located at a distance from the second slider front edge 308, especially wherein the slot 310 is formed in one of the side arms 314, especially in both side arms 314 of the second slider 306. The second slider 306 is included in the second embodiment of the security device 300 as shown in FIGS. 4*a*, 4*b*.

The coupling may be adapted for blocking the locking mechanism from the unlocked state unless the slider is in the closed slider position, for example due to the stopper described above with reference to FIGS. 4*a* and 4*b*.

According to embodiments, the at least one fuse 100 may include three fuses, wherein especially each of the three fuses is connected to one of three current phases. According to embodiments, the at least one fuse canister 106 may include three fuse canisters, wherein especially each canister 106 receives or is adapted to receive one of the fuses 100. According to embodiments, the fuse canister 106 i) may be shaped as an elongated cuboid or cylinder with circular or elliptic cross section, and/or ii) may have a vertical axis 108, and/or iii) has two lateral sidewalls. The three canisters 106 can be arranged next to each other, i.e. side by side.

According to embodiments, the at least one may include a plurality of earthing switches, wherein especially each end 102, 104 of each fuse 100 may be connected to one of the earthing switches. According to embodiments, the earthing switch 317, 318 may be operable from the open to the closed state by the propulsion element 400. According to embodiments, the earthing switch 317, 318 may be operable from the closed to the open state by the side arms 314 of the slider 302, that are driven by the access handle 320.

According to embodiments, the earthing switch may include i) a movable contact 318 formed as a pin electrically and mechanically connected to slider back panel or earthing bar of the earthing switch, and ii) a fixed contact 317 electrically connected to a cable connection 500 connecting to an external cable, preferably a feeding cable leading to consumers such as a transformer.

According to embodiments, the least one earthing switch may include a first earthing switch and a second earthing switch, each connected to one end 102, 104 (i.e., 102 or 104) of the fuse 100, wherein both switches are preferably simultaneously or optionally sequentially operable by the side arms 314 of the slider 302. Preferably, the first earthing switch and the second earthing switch includes each three earthing switches. Especially, all switches may be simultaneously operable. Each of the three first earthing switches and each of the three second earthing switches may be connected to a respective one of the three current phases. Preferably, all three phases may be earthed simultaneously. Alternatively, the activation moment can be for each upstream and downstream earth switch different and independent from each other. In this document, upstream and downstream are related to the direction of the energy flow.

According to embodiments, a security device 300 associated with a specific fuse 100 is configured to provide earthing both ends 102, 104 of the fuse 100 when opening any one of three canisters 106 for accessing any one of three fuses 100 that is connected to one of the three current phases. Especially, the three phases may be operated by the slider 302 or access handle 320 associated with the central one of the three side by side arranged canisters 106. Especially, earthing the central one of the three fuses 100 may effect earthing all fuses 100. Preferably, the peripheral canisters 106 cannot be opened if access to the central canister 106 is blocked, so that the locking mechanism associated with the central fuse 100 or central canister 106 may serve as an interlock for peripheral canisters 106.

According to embodiments, an access handle controlling one of the locking mechanisms may act as a master access handle activating the earthing switches associated with the other canisters 106. The master access handle may be associated with any of the three canisters 106 or may a separate access handle that is not associated with a specific canister 106. Preferably, an access handle associated with the central of three canister 106 may serve as master access handle.

According to embodiments described herein, a method of operating a switch-fuse module 10 having the security device 300 may include:

a) moving the slider 302, 306 from the closed slider position to the open slider position i) to bias or charge the energy-storing propulsion element 400, ii) to turn the earthing switch 317, 318 to the open state, and iii) to lock the locking mechanism for blocking access to the fuse 100; and b) moving the slider 302, 306 from the open slider position to the closed slider position i) to move the earthing switch 317, 318 from the open to the closed state while the propulsion element 400 discharges, for earthing the end 102, 104 of the fuse 100, and ii) to unlock the locking mechanism for releasing access to the fuse 100.

According to embodiments, step a) may include i) rotating the access handle 320 from the closed access handle position to the open access handle position, thus linearly moving the slider 302, 306 from the closed slider position to the open slider position by means of the conversion mechanism 324, 326, and/or ii) locking the locking mechanism by blocking the removal of the canister cover 110.

According to embodiments, step b) may include rotating the access handle 320 from the open handle position to the closed handle position, thus enabling the slider 302, 306 to linearly move from the open slider position to the closed slider position by means of the conversion mechanism 324, 326, and/or ii) unlocking the locking mechanism by releasing the removal of the canister cover 110.

According to embodiments, the switch-fuse module 10 may include a housing having therein a switch compartment 12 including an insulating gas and a fuse compartment, a switch disconnector 200 being arranged within the switch compartment 12, and the fuse 100 being arranged within the fuse compartment. The insulating gas may have a global warming potential less than a global warming potential of SF6. Especially, the switch compartment 12 may be different and separate from the fuse compartment.

According to embodiments, the switch compartment 12 and the fuse compartment may be arranged adjacently, preferably spaced from each other at a first distance. Preferably, the first distance may be understood as the thickness of at least one wall separating the switch compartment 12 from the fuse compartment or as a distance between a lateral side wall of a fuse canister 106 and a side wall of the switch compartment 12 adjacent to the fuse canister 106. The first distance may be at least 2 mm, 5 mm, or 10 mm, up to at most 20 mm, 40 mm, or 100 mm. Especially, the fuse compartment may be understood as a fuse arrangement.

According to embodiments, the switch compartment 12 may be arranged vertically above the fuse compartment. This arrangement advantageously makes it possible to keep to a minimum the horizontal footprint, i.e. the horizontal extension of the switch-fuse module 10 corresponding to the projection of the switch-fuse module 10 on the horizontal x-z plane, while at same time fully maintaining the structural stability or steadiness of the equipment.

According to embodiments, the switch disconnector 200 may be configured as a load-break switch (LBS). Especially, the switch disconnector 200 may be configured as an integrated two-position load break switch plus a separate, second earthing switch including an earthing shaft 206. The switch disconnector 200 may have two shafts: i) one shaft is operable by a first handle 202 and is used to open or close the main line, and ii) the other shaft 206 is operable by a second handle 204 and is used to open or earth the main line.

According to embodiments, the fuse 100 may be electrically connected at a first end 102 to the switch disconnector 200 via an internal bushing passing from the switch compartment 12 into the fuse compartment. Herein, the internal bushing may pass horizontally through vertical enclosure walls of the fuse compartment and of the switch compartment 12.

According to embodiments, the fuse 100 may be electrically connected at a second end 104 to a connector bushing.

According to embodiments, the connector bushing may be arranged laterally adjacent to the fuse 100.

According to embodiments, the switch-fuse module 10 may include a second earthing switch that is arranged in the switch compartment 12 between the internal bushing and the switch disconnector 200.

According to embodiments, the switch compartment 12 and the fuse compartment may be gas-tight with respect to each other. That means that the switch compartment 12 and fuse compartment may be isolated from each other in a gas-tight manner. This effects the possibility that pressure conditions and gas compositions in the respective compartments, especially in the switch compartment 12, are separately established and controlled. This effect is beneficial based on improved control options of the respective compartments depending on the technical requirements, and/or increased flexibility in terms of tailoring to customer requirements. For example, the switch compartment 12 may be enclosed in a gas-tight manner and possibly filled with a dielectric gas (first gas) different from ambient air, whereas the fuse compartment may be filled with ambient air at ambient pressure (second gas). Possibly, the fuse compartment may be in communication with the ambient air, i.e., not enclosed in a gas-tight manner.

According to embodiments, the first gas and the second gas may have each a dielectric strength lower than the dielectric strength of SF6.

According to embodiments, the switch-fuse module 10 may be configured for a rated voltage in a range from 1 kV to 52 kV.

According to embodiments, the switch-fuse module 10 may include at least one busbar arranged at a second distance above the switch compartment 12, wherein the second distance is at least a distance dielectrically suitable for a rated voltage in a range from 1 kV to 52 kV in the presence of the first insulating gas.

Some embodiments relating to the geometry and dimensions of the switch-fuse module 10 are described as follows.

The switch-fuse module 10 and/or ring main unit including the switch-fuse module 10 may have a height of more than 1000 mm and/or less than 1750 mm, or alternatively more than 1000 mm and/or less than 2000 mm. For example, the switch-fuse module 10 may have a height of less than 1750 mm.

The switch-fuse module 10 and/or ring main unit may have a depth of more than 500 mm and/or less than 850 mm, or alternatively more than 500 mm and/or less than 1000 mm. For example, the switch-fuse module 10 may have a depth of less than 850 mm.

The switch-fuse module 10 and/or ring main unit may have a width of more than 300 mm and/or less than 800 mm, or alternatively more than 300 mm and/or less than 1000 mm. For example, the switch-fuse module 10 may have a width of less than 800 mm.

It may be understood that a larger switch-fuse module 10 and/or ring main unit dimensions may be suitable for a higher rated voltage. For example, a switch-fuse module 10 and/or a ring main unit may be for a rated voltage in a range from 1 kV or 12 kV to 24 kV, with a height of more than 1000 mm and/or less than 1750 mm, depth of more than 500 mm and/or less than 850, and/or width of more than 300 mm and/or less than 800 mm, while a switch-fuse module 10 and/or a ring main unit may be for a rated voltage in a range from 36 kV to 42 kV, with a height of more than 1000 mm and/or less than 2000 mm, depth of more than 500 mm and/or less than 1000, and/or width of more than 400 mm and/or less than 1000 mm.

Some embodiments relating to the fuse 100 and switch-disconnector 200 are described as follows.

In some embodiments, up to five switches, e.g. disconnector 200-switches, and/or panels, e.g. general panels, may be included in the switch compartment 12.

A puffer switching device or vacuum interrupter may be utilised as the switch-disconnector 200. Alternatively, a puffer switching device may be utilised in addition to the switch-disconnector 200. Alternatively, a vacuum interrupter may be utilised. The puffer switching device may include a fixed tulip contact. The fixed tulip contact may be connected to the busbar. The puffer switching device may include a linearly sliding electrode, a blowing compression chamber, and/or blowing ports. The puffer switching device may include a rotating shaft to disconnect the line, which may be a load break shaft for example. The switch compartment 12 may cover the load break shaft of the panel.

Some embodiments relating to the insulating gases are described as follows.

The switch compartment 12 and/or the fuse compartment may each be configured as a pressurized tank containing an insulating gas with dielectric strength lower than dielectric strength of SF6. The pressurized tank may be configured to be filled, for example during installation and/or commissioning, to an absolute pressure in a range from 1.0 bar to 1.5 bar, preferably in a range from 1.3 bar to 2.0 bar.

Global warming potential may be understood to be assessed over an interval of 100 years, relative to CO2 gas. SF6 may be considered to have a global warming potential of 22,200 times that of CO2 over a 100-year period. The insulating gases having dielectric strength lower than dielectric strength of SF6 include at least one gas component selected from the group consisting of: CO2, O2, N2, H2, air, N2O, a hydrocarbon, in particular CH4, a perfluorinated or partially hydrogenated organofluorine compound, and mixtures thereof. In further embodiments, the insulating gases include a background gas, in particular selected from the group consisting of: CO2, O2, N2, H2, air, in a mixture with an organofluorine compound selected from the group consisting of: fluoroether, oxirane, fluoramine, fluoroketone, fluoroolefin, fluoronitrile, and mixtures and/or decomposition products thereof. For example, the insulating gases may include dry air or technical air. Each of the insulating gases may be a dielectric insulating medium. The insulating gases may in particular include an organofluorine compound selected from the group consisting of: a fluoroether, an oxirane, a fluoramine, a fluoroketone, a fluoroolefin, a fluoronitrile, and mixtures and/or decomposition products thereof. In particular, the insulating gases may include as a hydrocarbon at least CH4, a perfluorinated and/or partially hydrogenated organofluorine compound, and mixtures thereof. The organofluorine compound is preferably selected from the group consisting of: a fluorocarbon, a fluoroether, a fluoroamine, a fluoronitrile, and a fluoroketone; and preferably is a fluoroketone and/or a fluoroether, more preferably a perfluoroketone and/or a hydrofluoroether, more preferably a perfluoroketone having from 4 to 12 carbon atoms and even more preferably a perfluoroketone having 4, 5 or 6 carbon atoms. The insulating gases preferably includes the fluoroketone mixed with air or an air component such as N2, O2, and/or CO2.

In specific cases, the fluoronitrile mentioned above is a perfluoronitrile, in particular a perfluoronitrile containing two carbon atoms, and/or three carbon atoms, and/or four carbon atoms. More particularly, the fluoronitrile can be a perfluoroalkylnitrile, specifically perfluoroacetonitrile, perfluoropropionitrile (C2F5CN) and/or perfluorobutyronitrile (C3F7CN). Most particularly, the fluoronitrile can be perfluoro-isobutyronitrile (according to formula (CF3)2CFCN) and/or perfluoro-2-methoxypropanenitrile (according to formula CF3CF(OCF3)CN). Of these, perfluoroisobutyronitrile is particularly preferred due to its low toxicity.

As an example, the switch-fuse module 10 can operate with air, dry air, and/or a gas mixture including air for a rated voltage in a range from 1 kV to 52 kV, for example 12 kV or a 12 kV rated switchgear. In another example, the switch-fuse module 10 can operate with a gas mixture including a C5 perfluoroketone and/or air, for a rated voltage in a range from 1 kV to 52 kV, for example 24 kV or a 24 kV rated switchgear.

Some embodiments relating to elements of the switch-fuse module 10 are described as follows.

The switch-fuse module 10 may be configured for a rated voltage in a range from 1 kV to 52 kV, or from 1 kV to 42 kV, or from 10 kV to 42 kV, or from 12 kV to 42 kV, or for 12 kV and 24 kV and/or 36 kV and/or 40.5 kV. In one particular example, it may be understood that a 24 kV rated unit may fulfil dielectric withstand of at least 125 kV lightning impulse.

The first distance between a lateral side wall of a fuse canister 106 and a side wall of the switch compartment 12 adjacent to the fuse canister 106 may provide dielectric capability for a rated voltage, for example for a rated voltage in a range from 1 kV to 52 kV.

The switch-fuse module 10 may include at least one busbar. In an example, the busbar may be a metallic strip or bar, and/or may be housed inside a switchgear, a panel board, and/or busway enclosures, and in some examples, suitable for local and/or high current power distribution and/or suitable for connecting high voltage equipment. The busbar may be arranged substantially parallel to a vertical plane that includes the switch-disconnector 200, and/or in a horizontal direction or alternatively in a vertical direction, and/or perpendicular to a central axis of the fuse 100.

The busbar may be mounted above the fuse 100 and/or the switch-disconnector 200. The busbar may be a long connection (for example, a busbar adapted for interconnecting a plurality of panels or switchboards such as the switch-fuse module), or a short connection (for example, a busbar section interconnecting the switch-disconnector 200 with a further bushing, wherein said further bushing may be connected to a line or to a further busbar section).

A space between the fuse 100 or the electrical linkage of the fuse 100, and the enclosure walls provides dielectric capability for a rated voltage in a range from 1 kV to 52 kV. In an exemplarily embodiment, at least one busbar may be arranged at a second distance above the switch-disconnector 200, wherein the second distance may be at least a distance dielectrically suitable for a rated voltage in a range from 1 kV to 52 kV in the presence of the insulating gases at operating conditions.

The switch-fuse module 10 may be adapted to protect a transformer that may be part of an electrical network.

The switch-fuse module 10 may be interconnected, e.g., via a busbar, to further panels and/or switchboards interconnected by the busbar, thereby constituting a switchgear comprising the panels and/or switchboards including the switch-fuse module 10. The switch fuse module 10 may be an outermost panel of a switchgear. Where the switch-fuse module 10 is the outermost panel of a switchgear, top or side bushings may be mounted. A positioning of components such as the fuse 100, the electrical linkage, the busbar and/or the switch-disconnector 200 may provide the needed dielectric strength. The external surface of conductive materials may be configured to provide the needed dielectric strength.

This written description uses examples to disclose the disclosure, including the best mode, and also to enable any person skilled in the art to practice the described subject-matter, including making and using any apparatus or system. Embodiments described herein provide an improved switch-fuse module and ring main unit which can be operated in a particularly safe manner. While various specific embodiments have been disclosed in the foregoing, mutually non-exclusive features of the embodiments described above may be combined with each other. The patentable scope is defined by the claims, and other examples are intended to be within the scope of the claims if they have structural elements that do not differ from the literal language of the claims, or if they include equivalent structural elements with insubstantial differences from the literal language of the claims.

The invention claimed is:

1. A switch-fuse module having a security device, the switch-fuse module comprising:

at least one fuse; and at least one fuse canister having the at least one fuse inside;

the security device including:

at least one slider configured to linearly move between an open slider position and a closed slider position;

at least one earthing switch that i) is galvanically connected to an end of the at least one fuse, ii) is operable between an open and a closed state, iii) is designed to earth the end of the at least one fuse in the closed state, and iv) is coupled to the at least one slider in such a manner that the open slider position effects the open state of the at least one earthing switch and the closed slider position effects the closed state of the at least one earthing switch;

an energy-storing propulsion element configured to move the at least one earthing switch from the open to the closed state when discharging; and a locking mechanism adapted for blocking access to the at least one fuse in a locked state and for releasing access to the at least one fuse in an unlocked state, wherein the at least one slider is coupled to the locking mechanism in such a manner that the at least one slider is in the closed slider position while the locking mechanism is in the unlocked state, so that the at least one fuse may only be accessed if it is ensured that the at least one fuse is earthed, wherein the energy-storing propulsion element is arranged at a back panel of the at least one slider located longitudinally opposed to a front edge of the at least one slider.

2. The switch-fuse module according to claim 1, wherein the at least one slider is coupled to the locking mechanism in such a manner that the open slider position effects the locked state of the locking mechanism.

3. The switch-fuse module according to claim 1, wherein the locking mechanism comprises an access handle; or the locking mechanism comprises a conversion mechanism converting a rotation motion of the access handle of the locking mechanism into a linear motion or propulsion of the slider when the access handle is rotated.

4. The switch-fuse module according to claim 1, wherein the locking mechanism comprises a rotatable access handle that includes a rotatable disc; or the locking mechanism comprises the rotatable access handle with the rotatable disc and a driving pin eccentrically located on the rotatable disc at a distance from a handle rotation axis and pointing laterally outwards.

5. The switch-fuse module according to claim 1, wherein the at least one fuse canister comprises a removable front cover mounted at a canister front; or the at least one fuse canister comprises the removable front cover mounted at the canister front, wherein the removable front cover i) is fixed in the open slider position, thus blocking access to the at least one fuse or ii) is removable in the closed slider position, thus releasing access to the at least one fuse.

6. The switch-fuse module according to claim 1, wherein the locking mechanism comprises a cover fastener adapted i) to fix a canister cover in the open slider position or ii) to release the canister cover in the closed slider position.

7. The switch-fuse module according to claim 1, wherein the energy-storing propulsion element is configured as an elastic element.

8. The switch-fuse module according to claim 1, wherein the at least one slider i) is movable between the open and the closed positions along a longitudinal slider axis, or ii) has the front edge that is lateral to the longitudinal slider axis or is lateral to a handle rotation axis, or iii) comprises side arms enclosing both sidewalls of the at least one fuse canister.

9. The switch-fuse module according to claim 1, wherein the back panel is configured as an earthing bar of the at least one earthing switch.

10. The switch-fuse module according to claim 1, wherein the energy-storing propulsion element is configured, in the biased state, i) to move the at least one slider from the open to the closed state when discharging, or ii) to move both the at least one earthing switch and the at least one slider, when discharging.

11. The switch-fuse module according to claim 1, wherein the energy-storing propulsion element is configured, in the biased state, to move both the at least one earthing switch and the at least one slider simultaneously, when discharging.

12. The switch-fuse module according to claim 1, wherein an access handle of the locking mechanism is adapted, when rotating from a handle open position to a handle closed position, to allow the energy-storing propulsion element to move the at least one slider when discharging.

13. The switch-fuse module according to claim 1, wherein a slider propulsion or slider movement is confined by a rotation angle of an access handle of the locking mechanism.

14. The switch-fuse module according to claim 1, wherein the front edge of the at least one slider extends continuously over a lateral extent of the at least one slider.

15. The switch-fuse module according to claim 1, wherein;

the at least one fuse comprises three fuses; or the at least one fuse canister comprises three fuse canisters; or the at least one fuse canister i) is shaped as an elongated cuboid or cylinder with circular or elliptic cross section, or ii) has a vertical axis, or iii) has two lateral sidewalls.

16. The switch-fuse module according to claim 1, wherein the at least one earthing switch is operable from the open to the closed state by the energy-storing propulsion element; or the at least one earthing switch is operable from the closed to the open state by side arms of the at least one slider, that are driven by an access handle.

17. The switch-fuse module according to claim 1, wherein the least one earthing switch comprises three earthing switches; or the least one earthing switch comprises the three earthing switches and the at least one fuse includes three fuses, wherein each earthing switch is connected to at least one end of a respective fuse.

18. The switch-fuse module according to claim 1, wherein the locking mechanism comprises a cover fastener including:

i) a rotatable disc with a driving pin pointing laterally inwards, or ii) a flange of the slider pointing laterally inwards, such as a protruding ridge, lip or edge of the slider.

19. The switch-fuse module according to claim 1, wherein the energy-storing propulsion element is configured as an elastic element including a compression spring, an extension spring, a torsion spring, or an elastic washer.

20. The switch-fuse module according to claim 1, wherein the energy-storing propulsion element is configured to be compressed between the back panel and a fixed stopper of the at least one fuse canister.

21. The switch-fuse module according to claim 1, wherein a slider propulsion or slider movement is confined by a position of a driving pin of the locking mechanism.

22. The switch-fuse module according to claim 1, wherein the front edge of the at least one slider is formed in one of the side arms or in both side arms of the at least one slider.

23. A ring main unit comprising a switch fuse module including:

at least one fuse; and at least one fuse canister having the at least one fuse inside;

the security device including:

at least one slider configured to linearly move between an open slider position and a closed slider position;

at least one earthing switch that i) is galvanically connected to an end of the at least one fuse, ii) is operable between an open and a closed state, iii) is designed to earth the end of the at least one fuse in the closed state, and iv) is coupled to the at least one slider in such a manner that the open slider position effects the open state of the at least one earthing switch and the closed slider position effects the closed state of the at least one earthing switch;

an energy-storing propulsion element configured to move the at least one earthing switch from the open to the closed state when discharging; and a locking mechanism adapted for blocking access to the at least one fuse in a locked state and for releasing access to the at least one fuse in an unlocked state, wherein the at least one slider is coupled to the locking mechanism in such a manner that the at least one slider is in the closed slider position while the locking mechanism is in the unlocked state, so that the at least one fuse may only be accessed if it is ensured that the at least one fuse is earthed, wherein the energy-storing propulsion element is arranged at a back panel of the at least one slider located longitudinally opposed to a front edge of the at least one slider.

24. A method of operating a switch-fuse module having a security device, the switch-fuse module comprising:

at least one fuse; and at least one fuse canister having the at least one fuse inside;

the security device including:

at least one slider configured to linearly move between an open slider position and a closed slider position;

at least one earthing switch that i) is galvanically connected to an end of the at least one fuse, ii) is operable between an open and a closed state, iii) is designed to earth the end of the at least one fuse in the closed state, and iv) is coupled to the at least one slider in such a manner that the open slider position effects the open state of the at least one earthing switch and the closed slider position effects the closed state of the at least one earthing switch;

an energy-storing propulsion element configured to move the at least one earthing switch from the open to the closed state when discharging; and a locking mechanism adapted for blocking access to the at least one fuse in a locked state and for releasing access to the at least one fuse in an unlocked state, wherein the at least one slider is coupled to the locking mechanism in such a manner that the at least one slider is in the closed slider position while the locking mechanism is in the unlocked state, so that the at least one fuse may only be accessed if it is ensured that the at least one fuse is earthed, wherein the energy-storing propulsion element is arranged at a back panel of the at least one slider located longitudinally opposed to a front edge of the at least one slider; and wherein the method includes the steps of:

a) moving the at least one slider from the closed slider position to the open slider position i) to bias or charge the energy-storing propulsion element, ii) to turn the at least one earthing switch to the open state, and iii) to lock the locking mechanism for blocking access to the at least one fuse; and b) moving the at least one slider from the open slider position to the closed slider position i) to move the at least one earthing switch from the open to the closed state while the energy-storing propulsion element discharges, for earthing the end of the at least one fuse, and ii) to unlock the locking mechanism for releasing access to the at least one fuse.

25. The method according to claim 24, wherein:

the locking mechanism comprises a conversion mechanism converting a rotation motion of an access handle of the locking mechanism into a linear motion or propulsion of the slider when the access handle is rotated;

step a) comprises i) rotating an access handle from a closed handle position to an open handle position, thus linearly moving the at least one slider from the closed slider position to the open slider position by means of the conversion mechanism, and/or ii) locking the locking mechanism by blocking a removal of a canister cover.

26. The method according to claim 25, wherein:

step b) comprises rotating the access handle from the open handle position to the closed handle position, thus enabling the at least one slider to linearly move from the open slider position to the closed slider position by means of the conversion mechanism, and/or ii) unlocking the locking mechanism by releasing the removal of the canister cover.

* * * * *